June 4, 1968     S. R. STERNER     3,386,117
SYSTEM FOR CONNECTING BUOYANT BODIES TOGETHER
Filed Dec. 8, 1965
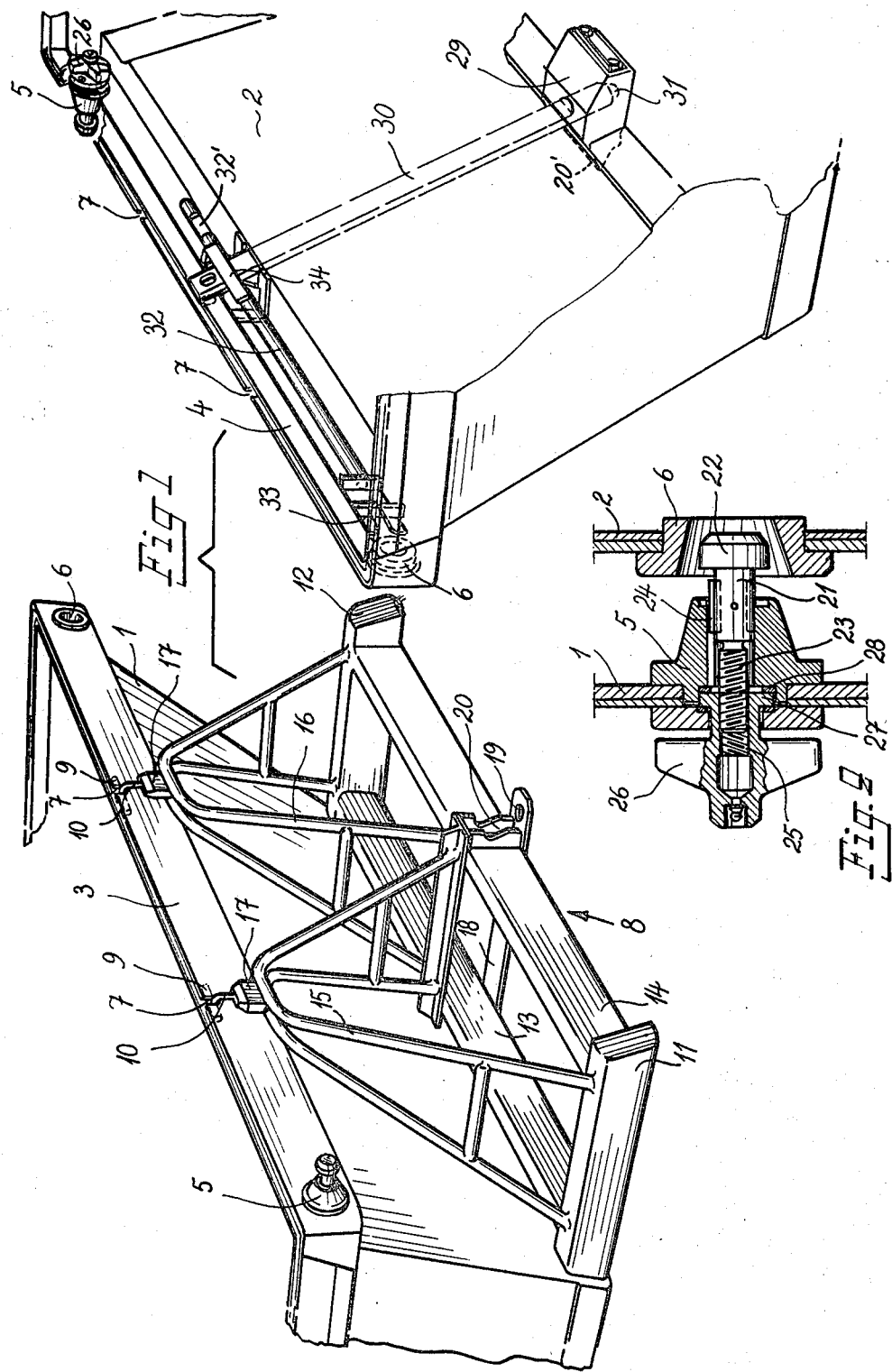

3,386,117
SYSTEM FOR CONNECTING BUOYANT
BODIES TOGETHER
Stig Roland Sterner, Skultuna, Sweden, assignor to Aktiebolaget Svenska Metallverken, Vasteras, Sweden, a joint-stock company limited
Filed Dec. 8, 1965, Ser. No. 512,321
Claims priority, application Sweden, Dec. 10, 1964, 14,916/64
9 Claims. (Cl. 14—27)

ABSTRACT OF THE DISCLOSURE

A system for connecting floating bodies together in which a number of male and female coupling members are located in a predetermined pattern above the water line each of said body, the male and female coupling members being conical in shape so that upon connection of the bodies they are automatically aligned by the self-centering action of the engaging coupling members. The male and female coupling members are so situated that at least one male and one female coupling is found on the connecting sides of the floating bodies, so that said bodies are fully interchangeable. The system also includes a draw bar supported by an intermediate buoyant body and located below the water line, each end of the draw bar being provided with a claw coupling which engages a socket of corresponding configuration located on the sides of the bodies. The male and female coupling members situated above the water line are locked in position by means of laterally movable locking bar while the claw coupling and socket is locked by means of a vertically movable locking bar.

---

The present invention relates to a method for connecting together pontoon bodies and the like whilst they are afloat.

When constructing temporary bridges over water-ways for military purposes or in the case where an existing bridge has collapsed or when said waterway must be bridged for the purpose of discharging traffic, pontoons usually produced in a standard model of definite, uniform dimensions have been used. With respect to difficulties incurred by transportation, such pontoons have also been so constructed that they are capable of being stacked together, usually by designing the sides so that they slope outwards allowing upwardly open pontoon bodies to be stacked vertically inside each other.

The joining of a number of such pontoon bodies so as to form a bridge, pier or the like has previously been accomplished by using screw joints or the like or, possibly in combination with screw joints, said pontoons have been linked together by the process of lifting one edge over and behind a corresponding edge of an adjacent pontoon body. Such a method of assembly, however, is difficult since the pontoon bodies are cumbersome and maneuverable in water.

Consequently it has long been a desire to provide a more simple arrangement for joining pontoon bodies together.

According to the invention there is provided a construction comprising pontoon bodies provided, at their coupling sides, with pairs of fittings for connecting the pontoon bodies, said fittings being situated in an easily accessible position above the surface of the water and at a predetermined distance from each other, and at least one link attachment adapted for connecting with a draw-link carried by the buoyant bodies and wherein a locking means is co-ordinated with the fittings as well as the link attachment to effect conjoint locking thereof.

The invention will be explained in greater detail below with reference to an embodiment shown in the attached drawing and from which further features characteristic to the invention will be disclosed.

In the drawing FIGURE 1 shows in perspective two connectable end walls of two pontoon bodies of exactly the same design together with a coupling trestle intended to form a connecting means between the lower sections of the pontoon bodies which usually float below the surface of the water.

FIGURE 2 shows a cross section of one coupling device in FIGURE 1 and a locking arrangement co-ordinated therewith.

The reference numeral 1 designates an end wall of a pontoon body and 2 the corresponding end wall of another body intended to be coupled to the first mentioned body. The pontoon bodies are reinforced at the top by means of a strengthening edge indicated by 3 and 4 respectively. A conical coupling member 5 is arranged on the far left of said edge 3 and on the far right is a conical recess fitting 6 conforming to the member 5, said fitting 6 being situated in a symmetrical position exactly opposite the last mentioned coupling member 5. It is assumed that similar arrangements are provided at the other end walls, not shown, of the pontoon bodies, so that a conical shaped coupling member always corresponds to a conical recess fitting on the opposite pontoon body.

A coupling trestle, indicated generally by 8, is suspended in suitable tracks 7 in edge 3, by the engagement therein of pins or the like 9 projecting from a leg 10. The coupling trestle is buoyant and is composed of two buoyant bodies 11 and 12 situated at opposite ends and two longitudinal buoyant bodies 13 and 14 which connect together the bodies 11 and 12. Secured to these buoyant bodies are two frames 15 and 16 mainly constructed of tubing bent to form a U-shape, and fastened together at the upper section with attachments 17 for the hook members 9, 10. Both the buoyant bodies 13 and 14 support, in the center, a coupling bar of link 18 provided at each end with a hole 19 and a claw 20 for a purpose which will be explained later. The coupling link 18 and the claws, should be, because of force-moments, positioned as far down as possible in relation to the coupling members 5 and 6 and therefore are usually situated under the surface of the water in a position where they are not usually visible from above the surface.

Prior to joining together the pontoon bodies, when these are approximately at the shown distance apart, the coupling trestle 8 is suspended, as shown, from one of the end walls whereupon the buoyant bodies 11, 12 lie supportingly against the end wall 1. Subsequent to this, both pontoon bodies are brought together in floating position, the conical coupling members 5 being substantially aligned with corresponding conical recess fittings 6. These coupling members are engaged into the fittings 6 and are guided to the coupling position by the conical surfaces. However, in order to relieve the forces acting on said coupling members, the draw-bar 18 and the grip-claws 20 are used, each of said claws 20 being situated at one end of the bar 18. The grip-claws 20 are thus intended to engage corresponding claws 20' which are securely attached to each end wall of the pontoon bodies. The coupling action between draw-bar and both pontoon bodies will be described below.

In order to explain more closely the conical coupling members, reference is made to FIGURE 2, where one coupling member 5 is seen in position immediately prior to being fitted with the conical recess fitting 6, the taper and dimensions of which substantially coincide with those of the member 5. Thus, when both the end walls 1 and 2 are brought together, the member 5 is moved into the recess fitting 6 whereupon both the members securely engage each other. Since it is desirable to lock this coupling in some suitable way, a bolt 21 has been centrally arranged in the member 5, said bolt 21 being provided with a head 22 and with a threaded shaft 23. This bolt 21 is prevented from rotating in the member 5 by means of wedges 24 engaging in suitable key ways. The threaded portion 23 enters into a nut member 25, which is further provided with a twist-handle 26. The nut member is furthermore provided with an annular flange 27, which by a suitable seating 28 is prevented from being displaced. By rotating the nut member 26 in either direction it is possible to produce a displacement, correspondingly directed therto, of the head 22 of the head-bolt 21 which head is intended to be used as a locking member in a way which will be described in conjunction with the description of the right hand section in FIGURE 1.

In order to provide, in accordance with FIGURE 1, for the coupling of the pontoon bodies with the assistance of the draw-bar 18, a socket, generally designated by 29, which extends into the end wall of the pontoon body 2, has been arranged at the bottom of said end wall 2, the grip claws 20 being intended to interfit with conforming grip-claws 20' arranged opposite the same on the socket. Since these members are not visible above the surface of the water they are intended automatically to direct the draw-bar 18 in such a way that each hole 19 lies opposite a vertically displaceable bar 30 outside each end wall. This bar is intended to be elevatable so that a lower conical end 31 at the moment of coupling seeks a hole 19 at one end of the draw-bar 18 and thereby locks it in the coupling position.

In order to lock the conical coupling members 5, 6 by using the head 22 on the head-bolt 21, a horizontally displaceable locking bar 32 has been located on the inside of each edge 3 and 4, said bar 32 being provided with a suitable yoke 33 at one end. When the conical coupling members 5, 6 (see FIGURE 2), are brought together into the engaging position and the head 22 on the head-bolt 21 is passed completely through and past the member 6 to a position where the yoke 33 can engage behind the head 22, it is possible, subsequent to having passed the yoke 33 behind the head 22, to retighten the head-bolt 21 with the assistance of the twist-handle 26 so that the head 22 strongly grips the yoke 33 while locking of the members 5, 6 in coupling position at each end of the end walls of the pontoon bodies. It may be mentioned in this context that the arrangement is such that when the bar 32 is displaced to locking position, according to the above, the previously lifted bar 30 is automaticaly released and drops down so that the conical members 31 engages the hole 19 on the drawbar 18.

A special shoulder 34 is arranged on the bar 30 proper and this shoulder normally rests on bar 32 but falls into a slot 32' thereof when the bar 32 is moved to the left in FIG. 1 to its locking position. When shoulder 34 is in slot 32', and the bar 32 is in its locked position, member 31 is engaged in hole 19 in the draw-bar 18. However, as soon as it is required to separate the pontoon bodies it is possible to release the engagement between the heads 22 of the locking bolts 21 and the yoke 33 on the locking bar by raising the bar 30 so that the shoulder 34 is moved out of slot 32' and thereby out of the movement path of the bar 32, so that the latter can be displaced so that the coupling members 5 and 6 are unlocked.

By means of the described arrangement it is thus possible to join together without difficulty, pontoon bodies solely by bringing the same together while floating with the use of the coupling trestle, the purpose of which is to produce an accurate positioning of the draw-bar 18 in an under-water position where the coupling cannot be superintended from above, a very quick and precise coupling being carried out while overcoming the moments acting on the pontoon coupling.

The invention is not limited to the shown and described embodiments of the same but can be varied in a variety of ways within the scope of the following claims.

What is claimed is:

1. In combination, a plurality of buoyant bodies connected together in end to end relation, each of said bodies having opposite ends and at least one male and one female coupling member arranged above the waterline on each end of the body, the male member at one end being in longitudinal alignment with the female member at the opposite end, the male and female members on the adjoining ends of adjacent bodies being interengaged; means for locking the male and female members together; an intermediate floating body between adjacent buoyant bodies, said intermediate floating body being coupled to one of said adjacent buoyant bodies and including a coupling bar; and means for connecting said coupling bar to said adjacent buoyant bodies below the waterline for horizontal and vertical alignment.

2. The combination as claimed in claim 1 wherein said means for connecting the coupling bar to adjacent buoyant bodies below the waterline comprises latch means on the coupling bar and on the buoyant bodies, and means for locking said latch means.

3. A system as claimed in claim 2 wherein each male coupling member includes a bolt member having a head capable of being passed through each female coupling member, said means for locking the coupling members together including a displaceable locking bar at the end of each buoyant body having an operative position in engagement with said head to prevent withdrawal of the head through the female member.

4. The combination as claimed in claim 3 comprising a nut member fixed against axial movement in the male member but capable of being rotated, said bolt member being threadably engaged in the nut member such that turning of the nut member will displace the bolt member and tighten the head against the locking bar thereby locking the coupling members.

5. The combination as claimed in claim 2 wherein said means for locking said latch means comprises a displaceable latching bar at each end of each buoyant body having an operative position in which the associated latch means is locked and thereby the associated buoyant body is locked with the coupling bar.

6. The combination as claimed in claim 5 wherein the means for locking the male and female coupling members together comprises a displaceable locking bar having an operative position in which the coupling members are locked together, said latching bar including a shoulder which rests on the locking bar in its inoperative position to hold said latching bar in inoperative position, the locking bar being provided with a slot cooperating with said shoulder so that upon displacement of the locking bar to its operative position the latching bar also adopts its operative position.

7. The combination as claimed in claim 1 including means for suspending the intermediate floating member from said one buoyant body to couple the same together.

8. The combination as claimed in claim 1 wherein said coupling members present engageable tapering surfaces which afford a snug fit between the male and female coupling members while providing self-alignment as the coupling members are engaged.

9. The combination as claimed in claim 1 wherein the means for connecting the coupling bar to the adjacent buoyant bodies comprises a socket on each said buoyant body and a claw on the coupling bar at opposite ends thereof for engaging the sockets.

References Cited

UNITED STATES PATENTS

| | | | |
|---|---|---|---|
| 2,480,144 | 8/1949 | Laycock | 14—27 X |
| 2,944,270 | 7/1960 | Peaise | 14—27 |
| 2,977,612 | 4/1961 | Frost | 14—27 |
| 3,057,315 | 10/1962 | Robishaw | 114—0.5 |

JACOB L. NACKENOFF, *Primary Examiner.*